UNITED STATES PATENT OFFICE.

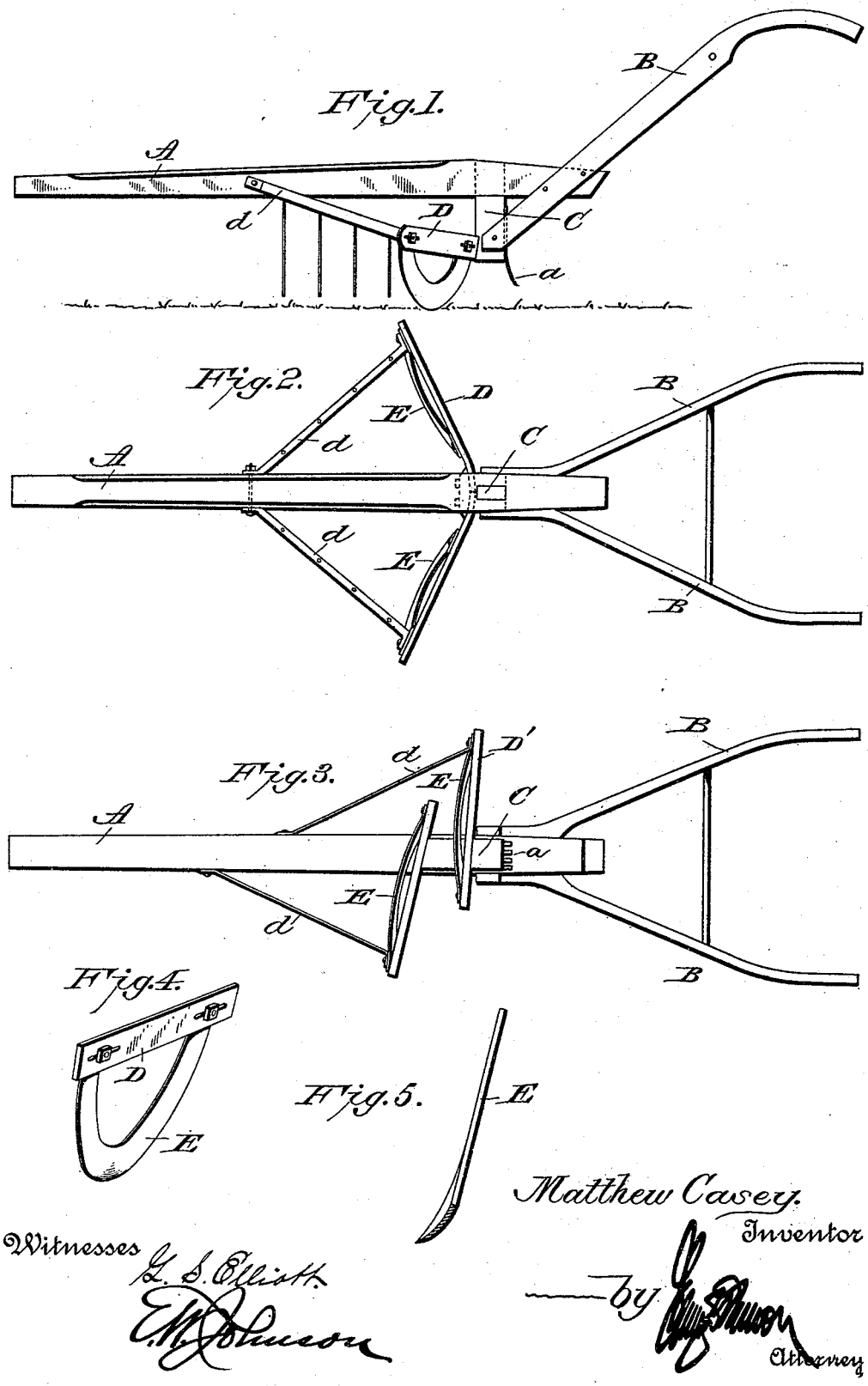

MATTHEW CASEY, OF SMITHFIELD, NORTH CAROLINA.

CULTIVATOR.

SPECIFICATION forming part of Letters Patent No. 491,873, dated February 14, 1893.

Application filed August 31, 1892. Serial No. 444,652. (No model.)

*To all whom it may concern:*

Be it known that I, MATTHEW CASEY, a citizen of the United States of America, residing at Smithfield township, in the county of Johnston and State of North Carolina, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in cultivators; the object of which is to provide an improved device for cultivating young corn or cotton, and by rearranging the parts may be used for cultivating between rows of plants; and the invention consists in the construction and combination of the parts, as will be hereinafter fully set forth and particularly pointed out in the claims.

In the accompanying drawings forming part of this specification: Figure 1 is a side view of a cultivator, the parts being arranged for cultivating over plants, such as young corn or cotton. Fig. 2 is a plan view. Fig. 3 is a bottom plan view, showing the device arranged for cultivating between rows. Fig. 4 is a detail view of one of the cultivators detached and Fig. 5 is a sectional view of the same.

A designates the beam of the cultivator, to which the handles B B are secured in the usual manner. The lower ends of the handles project beyond the beam and are secured to the lower end of a short standard C, said standard being rigidly attached to the beam. The lower end of this standard is provided with spring teeth $a$, which depend below said standard and are curved or bent rearward; the teeth being preferably made of spring steel or other resilient material. These spring teeth are only of sufficient strength to remove from the growing plants the earth which may fall upon them in cultivating.

D D' designate short beams to which the cultivators or shovels E are secured by means of bolts, or in any suitable manner. These beams are adapted to be secured to the front portion of the standard C, and in front of said beams is attached a block through which the securing bolts pass.

When the cultivator is arranged as shown in Fig. 1 a bar or beam $d$ extends from the outer ends of the shovel carrying beam to the main beam A, and these bars may be provided with depending teeth adapted to remove trash away from the path of the cultivator blades. The cultivator blades are constructed so that they are curved forwardly at their cutting edges, and are made up of semi-annular plates of metal, the ends of which are provided with bolt holes to receive bolts which pass into the beams D. It will be noted that the cultivators in Fig. 1 extend forwardly on each side of the standard, so that when in use the earth will be thrown toward the plants. The standard C passing over the plants, and the soil being removed therefrom by the teeth $a$.

In Fig. 3 of the drawings I have shown another arrangement of the cultivator shovels, which arrangement is adapted to be used in cultivating between rows of growing plants; and in this case one of the beams D' is secured directly to the forward portion of the short depending standard C, and a block is placed in front of the same to which the other shovel carrying beam is secured. When thus arranged the shovel carrying beams will have their ends extended beyond each side of the standard, one beam extending a suitable distance on one side of the standard while the other beam extends the desired distance on the other side. The bars $d$ extend from the ends of the shovel carrying beams D to the main beam and serve as braces.

The device hereinbefore described is simple in construction, can be cheaply manufactured, and can be arranged so as to provide the user with two implements, which are adapted to cultivate the plants at different stages of growth, and when arranged as shown in the drawings will cultivate on each side of the growing plants, and also between the rows.

Having thus described my invention I do not wish to confine myself to the exact construction of the device herein shown and described, but reserve the right to modify the same.

I claim:

1. In a cultivator, the combination of the main beam A carrying a short depending standard C, handles attached near the rear end of the beam and to the lower end of the standard, bars or beams carrying cultivator knives semi-annular in form, said bars being removably attached to the standard and provided at their outer ends with brace rods, substantially as shown, and for the purposes set forth.

2. In a cultivator for the purposes set forth, the combination of the main beam having a short depending standard and handles, of spring teeth attached to the standard so as to depend below the same, the lower ends of said teeth being rearwardly inclined, beams carrying cultivators attached to the forward portion of the standard so as to project laterally therefrom and locate the cultivators on opposite sides of the standard, bars or rods $d$ attached to the outer ends of the cultivator beams and to the main beam, substantially as shown, and, for the purposes set forth.

3. The combination in a cultivator, of the main beam, short depending standard, and handles, rigidly secured to each other, substantially as shown, cultivator carrying bars or beams D′, brace bars extending from the ends of said cultivator beams to the main beam, the brace bars being provided with depending teeth, substantially as shown, and for the purpose set forth.

In testimony whereof I affix my signature in presence of two witnesses.

MATTHEW CASEY.

Witnesses:
A. M. WOODALL,
W. S. STEVENS.